United States Patent [19]

Longuet et al.

[11] Patent Number: 4,910,925

[45] Date of Patent: Mar. 27, 1990

[54] DEVICE FOR REDUCING SPLASHING OF LIQUID IN A GRINDING MACHINE

[75] Inventors: Raynald G. M. Longuet, Le Gros Theil; Jean-Pierre M. F. Langlois, Rouen, both of France

[73] Assignee: Briot International, Elbeuf, France

[21] Appl. No.: 355,300

[22] Filed: May 22, 1989

[30] Foreign Application Priority Data

Jun. 2, 1988 [FR] France ............................ 88 07351

[51] Int. Cl.⁴ .................... B24B 55/04; B24B 9/14
[52] U.S. Cl. ............................................. 51/272; 51/270
[58] Field of Search ................. 51/268, 272, 270, 273

[56] References Cited

U.S. PATENT DOCUMENTS 2,499,582  3/1950  Harrison ............................ 51/273

FOREIGN PATENT DOCUMENTS 2557000  6/1985  France ............................ 51/272
776904  11/1980  U.S.S.R. ......................... 51/270

Primary Examiner—Roscoe V. Parker
Attorney, Agent, or Firm—Martin Smolowitz

[57] ABSTRACT

The device comprises a grille (9) by multiple slats (11) which are inclined in the manner of slats of Venetian blinds, in the direction of rotation of the grinding wheel, and are disposed obliquely relative to the horizontal between two upright plates (10,10') to which the slats are fixed by the ends of the slats. Openings (12) are provided in one plate (10') of the plates which carries the lowermost ends of the slats 11, in the region of these ends.

7 Claims, 1 Drawing Sheet

DEVICE FOR REDUCING SPLASHING OF LIQUID IN A GRINDING MACHINE

BACKGROUND OF THE INVENTION

The present invention relates to grinding machines and more particularly to the liquid spraying of the grinding wheel.

The spraying of a grinding wheel with a liquid always results in a projection and splashing of liquid and, in some cases, in the formation of mist. The volume and the direction of such liquid projection and the formation of the mist are functions of various parameters, among which the most important are the position and the rate of flow of the spraying liquid and the speed of the grinding wheel.

In most cases, the grinding wheel is surrounded by a housing which receives and canalizes the projected liquid toward a recovering or eliminating tank.

In grinding machines in which the grinding wheel rotates at high speed employed for work of precision requiring a constant supervision of the work piece to be ground, the liquid splashing and the mist may considerably hinder the observation of this work piece.

Some devices are known which are designed to prevent an irregular dispersion of the liquid splashes and, for example, comprise sets of fins which are disposed in the housing on the downstream side of the work piece to be ground, so as to prevent the drops of liquid from rebounding by breaking their trajectory and collecting them and subsequently allowing the liquid to flow under the effect of gravity into a collecting tank. Generally, these fins have a relatively complicated configuration and their arrangement in the housing, to which they are secured, is such that the fins collect and retain a large part of the liquid with particles of material which are deposited therein and finally soil the arrangement. Such soiling requires taking down the housing for cleaning and scraping the fins.

French Patent o. 2,557,000 discloses in particular an arrangement of this type in the application thereof in a machine for grinding ophthalmic glasses. In this disclosed device, fins are provided which are secured to the inner surface of the housing and each fin has a curved cross-sectional shape and, when viewed in plan, a shape bent at an obtuse angle however, in this device, the particles of material detached by the grinding wheel accumulate in the corners formed between the wall of the housing and the curved fins and in the fins.

SUMMARY OF THE INVENTION

An object of the present invention is to overcome these drawbacks by providing a fin device adapted to be fixed in a housing of a grinding wheel in a grinding machine, this device being adapted to avoid the accumulation of the particles of material in the corners and facilitate the flowing of the liquid, and at the same time having a fin-washing effect.

The invention therefore provides a device for reducing splashing of sprayed liquid in the housing of a grinding machine, said device being constituted by a grille formed by multiple slats inclined in the manner similar to the slats of Venetian blinds, and in the direction of rotation of the grinding wheel, but disposed obliquely relative to the horizontal and fixed between two upright plates to which they are fixed at their ends. Opening are provided in that one of said plates carrying the lowermost ends of said slats in the region of said lowermost ends.

With this orientation of the slats, the latter present to the drops of liquid projected behind the work piece being ground an inclined surface, which descends on one hand axially and rearwardly and on the other hand radially toward the right (or toward the left) of the grinding wheel. The drops of liquid flow under the effect of gravity along said slats to their lower ends from which the liquid collected in this way flows through the opening in the plate carrying the lowermost ends of the slats via said openings.

Grilles having inclined slats according to the invention may be placed in the upper part of the machine housing, preferably roughly at the level with the grinding wheel of the line of contact of the work piece to be ground.

DESCRIPTION OF THE DRAWINGS

The following description, with reference to the accompanying drawings given as non-limitative examples, will explain how the invention may be put into effect.

DESCRIPTION OF THE PREFERRED EMBODIMENTS

Figure 1:
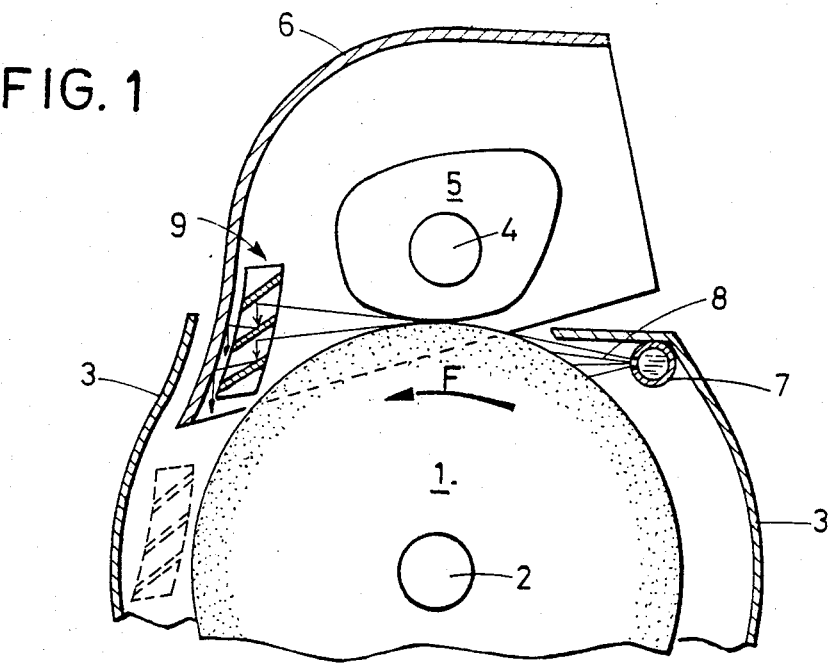
FIG. 1 is a partial vertical sectional view which is transverse to the shaft of the grinding wheel and to the shaft carrying the glass on the carriage of a machine for grinding ophthalmic glasses.

With reference to FIG. 1, there is illustrated a part of a machine for grinding ophthalmic glasses, i.e. a part of a grinding wheel 1 mounted on its shaft 2 so as to rotate in the lower part 3 of a housing which is open in its upper part. The shaft 4 of a carriage (not shown) carrys an ophthalmic glass piece 5 to be ground in contact with the grinding wheel 1, and rotates in an upper part 6 of said housing connected to the carriage which housing is open on its front side to permit observing the work in course.

The grinding wheel 1 rotates in the direction of arrow F. A rack 7 for distributing a grinding wheel-spraying liquid is disposed in confronting relation to the wheel 1 in the front upper part 3 of the housing, 3 so as to direct a jet 8 onto the upper part of the grinding wheel on the upstream side of the point of contact with the glass 5 being ground.

In operation, the liquid is entrained by the grinding wheel 1 and is violently projected rearwardly on the downstream side of the glass 5 and rebounds on the wall of the parts 3 and 6 of the housing by creating splashes and causing the formation of a mist which hinders the observation of the work when a plate of glass is provided in the opening of the upper part 6 of the housing, this mist is deposited on the glass and renders any observation impossible.

In order to overcome this drawback, it is proposed to dispose fins fixed on the inner wall of the housing in different regions of the latter, and in particular around the rear upper or lower part of the grinding wheel.

Figure 2:
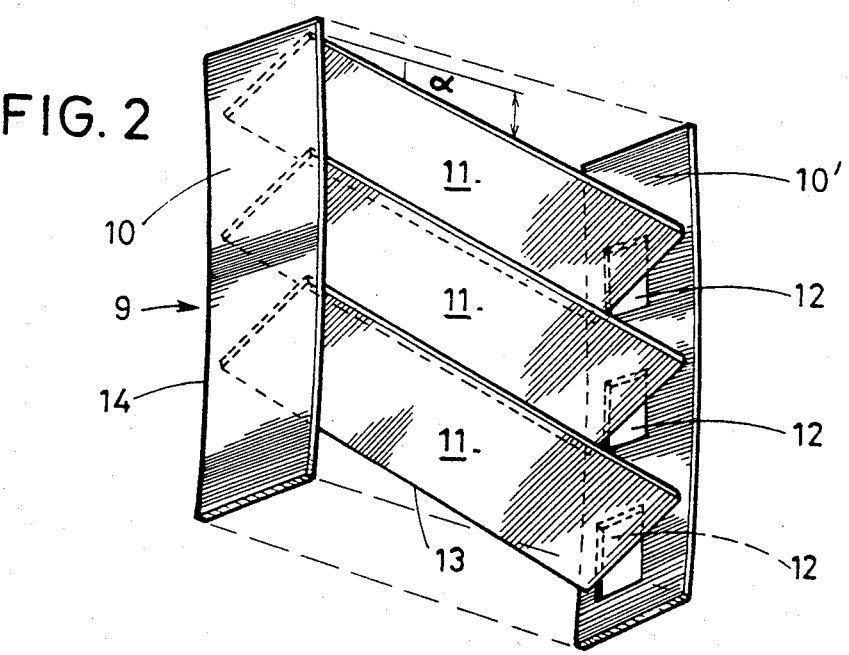
FIG. 2 is a perspective view to an enlarged scale of an assembly of fins or slats according to the invention.

According to the invention, a grille comprising multiple inclined fins or slats is generally designated by the reference numeral 9 and illustrated to an enlarged scale in FIG. 2.

The grille 9 is formed by two lateral uprights 10, 10' adapted to be secured in a substantially verticle position to the inner surface of the housing of the machine. The grille 9 consists of two elongated plates 10, 10' whose longitudinal edges may have a shape complementary to that of the part of the housing 6 to which the grille must be fixed.

The upright plates 10, 10' are interconnected by multiple parallel slats 11 each generally having a substantially rectangular shape, fixed at their ends to the plates 10, 10' in a position which is downwardly and rearwardly inclined as viewed in the FIG. 1 drawing, in the manner of the slats of Venetian blinds, but also positioned obliquely, i.e. with their end—for example the right end as viewed in the FIG. 2 drawing—which is downwardly offset relative to their opposite end. In other words, the grille 9 is formed in such manner that the slats 11 have one end which is lower than the other end when the grille is viewed from the front, the plates 10, 10' being equal in length and each are at the same height.

Advantageously, the slats 11 are obliquely disposed so as to form an angle $\alpha$ of about 30° to the horizontal.

According to another feature of the invention, openings 12 are provided in the upright plate 10' to which the lower ends of the slats 11 are fixed and in such manner that the openings 12 straddle these lower ends of the slats.

It will moreover be observed that the slats 11 are fixed to the plates 10, 10' in such manner that their rear edge 13 is slightly spaced away from the rear edge 14 of the plates 10, 10' so as to provide a gap between the slats and the housing 6 when the grille is fixed in position in the housing.

As shown in FIG. 1, the grille 9 is advantageously secured in the upper part 6 of the housing in such manner as to cover a region extending in the upstream direction above and below the line of contact between the glass 5 and the grinding wheel 1. With this arrangement, in a first stage, the drops of liquid are projected by the grinding wheel 1 and travel through the grille 9. In a second stage, the drops of liquid rebound on the backs of the slats 11 and, in a third stage, the liquid received on the backs of the slats and the liquid which has impinged on the front side thereof flow under the effect of gravity through the openings 12 out of reach of the current of air produced by the rotation of the grinding wheel, the liquid being finally collected at the lower bottom of the part 3 of the housing. There is also avoided an accumulation of liquid and solid particles in the corners of the grille 9. In a modification, as shown in dot-dash lines in FIG. 1, the grille 9 may be disposed roughly at the level of the axis of rotation of the grinding wheel 1, or two grilles may be provided.

Although a grille 9 having three slats 11 has been illustrated, it will be understood that the grille may have any number of slats.

What is claimed is:

1. Device for reducing splashing of liquid in a housing of a grinding machine combined with said device and comprising a grinding wheel rotative in a given direction about an axis, and said housing which extends about the grinding wheel, said device comprising: a grille including two spaced-apart upright plates, multiple slats inclined substantially in the manner of slats of Venetian blind in said direction of rotation of the grinding wheel and disposed obliquely to the horizontal between the two upright plates and to which plates the slats are fixed by ends of the slats so that the slats each have an uppermost end and lowermost end, openings being provided in that one of the plates which carries the lowermost end of each slat in the region of said lowermost ends.

2. Device according to claim 1, wherein the slats of the grille are downwardly and rearwardly inclined in said direction of rotation of the grinding wheel, and extend obliquely relative to the horizontal and transversely relative to said direction of rotation of the grinding wheel.

3. Device according to claim 2, wherein the slats make an angle of substantially 30° to the horizontal.

4. Device according to claim 1, wherein the grille is fixed in the housing on the upstream side relative to said direction of rotation of the grinding wheel so as to cover a region which extends above and below a line of contact between a work piece to be ground and the grinding wheel.

5. Device according to claim 1, wherein the grille is fixed in the housing substantially at the level of the axis of rotation of the grinding wheel.

6. Device according to claim 1, wherein a grille is fixed at the level of the line of contact between the work piece to be ground and the grinding wheel, and another grille is fixed substantially at the level of the axis of rotation of the grinding wheel.

7. Device according to claim 4, wherein the slats have rear edges relative to the direction of rotation of the grinding wheel which are spaced away from an inner surface of the housing.

* * * * *